US011391325B2

(12) United States Patent
Na et al.

(10) Patent No.: US 11,391,325 B2
(45) Date of Patent: Jul. 19, 2022

(54) BEARING SYSTEM, BEARING SYSTEM CONTROL METHOD, AND COMPUTER PROGRAM FOR CONTROLLING BEARING SYSTEM

(71) Applicant: DAIDO METAL COMPANY LTD., Nagoya (JP)

(72) Inventors: Kwangik Na, Inuyama (JP); Yuji Kawaai, Inuyama (JP); Tadatoshi Nagasaki, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 17/059,832

(22) PCT Filed: Jul. 5, 2019

(86) PCT No.: PCT/JP2019/026903
§ 371 (c)(1),
(2) Date: Nov. 30, 2020

(87) PCT Pub. No.: WO2020/013099
PCT Pub. Date: Jan. 16, 2020

(65) Prior Publication Data
US 2021/0215204 A1    Jul. 15, 2021

(30) Foreign Application Priority Data

Jul. 12, 2018    (JP) .............................. JP2018-132137

(51) Int. Cl.
*F16C 17/24*    (2006.01)
*F16C 17/26*    (2006.01)
(Continued)

(52) U.S. Cl.
CPC ............ *F16C 41/00* (2013.01); *F16C 17/065* (2013.01); *F16C 17/24* (2013.01); *F16C 17/243* (2013.01);
(Continued)

(58) Field of Classification Search
CPC ........ F16C 17/06; F16C 17/065; F16C 17/24; F16C 17/243; F16C 17/246; F16C 17/26;
(Continued)

(56) References Cited

U.S. PATENT DOCUMENTS 3,246,640 A * 4/1966 Wagner ................. G01M 13/04
123/198 R
4,643,592 A    2/1987 Lewis et al.
(Continued)

FOREIGN PATENT DOCUMENTS

CN    102252843 A    11/2011
CN    102562783 A    7/2012
(Continued)

OTHER PUBLICATIONS

International Search Report issued in corresponding International Application No. PCT/JP2019/026903 dated Oct. 8, 2019.

*Primary Examiner* — Phillip A Johnson
(74) *Attorney, Agent, or Firm* — Snyder, Clark, Lesch & Chung, LLP

(57) ABSTRACT

In order to enable a bearing system in which a plurality of bearings operate simultaneously or in association with each other to achieve an optimal overall performance: this bearing system is equipped with a bearing A and a measurement execution unit A therefor, a bearing B and a measurement execution unit B therefor, and a control unit for controlling the measurement execution unit A and the measurement execution unit B; the control unit transmits an instruction to the measurement execution unit A and the measurement (Continued)

execution unit B to enable execution of the performance required of the bearing system. The measurement execution unit A and the measurement execution unit B respectively operate the bearing A and the bearing B under an instructed operation condition. The relationship of an operation condition A of the bearing A and an operation condition B of the bearing B to an index, which indicates each of the operational states of the bearing A and the bearing B when the bearing A and the bearing B are operated under the operation conditions therefor, has been measured and saved in advance. The control unit references the relationship and accordingly transmits an instruction to the measurement execution unit A and the measurement execution unit B.

17 Claims, 6 Drawing Sheets

(51) Int. Cl.
*F16C 41/00* (2006.01)
*F16C 17/06* (2006.01)
*G01L 5/00* (2006.01)
*G01M 13/04* (2019.01)

(52) U.S. Cl.
CPC .......... *F16C 17/246* (2013.01); *G01L 5/0009* (2013.01); *G01M 13/04* (2013.01); *F16C 2233/00* (2013.01); *F16C 2380/26* (2013.01)

(58) Field of Classification Search
CPC .... F16C 41/00; F16C 2233/00; G01L 5/0009; G01M 13/04
See application file for complete search history.

(56) References Cited

U.S. PATENT DOCUMENTS

| | | | |
|---|---|---|---|
| 6,886,985 B1 | 5/2005 | Kostrzewsky et al. | |
| 10,444,118 B2 | 10/2019 | May et al. | |
| 2016/0084734 A1 | 3/2016 | May et al. | |
| 2017/0081009 A1* | 3/2017 | Rubin | B63H 23/32 |

FOREIGN PATENT DOCUMENTS

| | | | | |
|---|---|---|---|---|
| DE | 2827993 A1 | | 1/1980 | |
| GB | 2548877 A | * | 10/2017 | ............... F01M 1/16 |
| JP | 55057723 A | * | 4/1980 | |
| JP | 2001-297973 A | | 10/2001 | |
| JP | 2008-106891 A | | 5/2008 | |
| JP | 2015-203393 A | | 11/2015 | |
| JP | 2016-153669 A | | 8/2016 | |
| KR | 20110123669 A | * | 11/2011 | |
| RU | 166258 U1 | * | 11/2016 | |
| WO | 2008050470 A1 | | 5/2008 | |
| WO | 2014174097 A1 | | 10/2014 | |
| WO | 2015106741 A1 | | 7/2015 | |

\* cited by examiner

BEARING SYSTEM, BEARING SYSTEM CONTROL METHOD, AND COMPUTER PROGRAM FOR CONTROLLING BEARING SYSTEM

TECHNICAL FIELD

The present invention relates to a bearing system, and more particularly relates to a system that controls a plurality of bearings in a bearing system in which the bearings operate simultaneously or in association with each other.

BACKGROUND ART

For example, in a hydroelectric power station, water taken in through the water intake of a dam is divided and allowed to flow through branch channels, and an electrical power generator is provided for each of the branch channels. That is, a plurality of electrical power generators operate in one plant or one area called a hydroelectric power station. Each of the electrical power generators is large, and therefore needs to be carefully maintained.

One of important points in the maintenance of the electrical power generator is a bearing. This is because the rotation shaft of the electrical power generator rotated by water flow is slidably supported by the bearing, and the greatest mechanical load is applied to the bearing. When the bearing is worn away, the electrical power generator is stopped to replace a bearing unit.

One approach to reduce abrasion, that means mechanical wear in the specification, of the bearing may be to increase the viscosity of lubricant oil supplied between the bearing and the rotation shaft. However, when the viscosity of the lubricant oil increases, it may increase viscosity of the lubricant oil acts as rotational resistance for the rotation shaft so that the loss of the electrical power generator increases. For this reason, the viscosity of the lubricant oil may not unnecessarily be increased. Of course, the loss of the electrical power generator decreases as the viscosity of the lubricant oil decreases, but a trade-off for decreasing the viscosity of the lubricant oil is that the bearing is likely to wear.

Here, the viscosity of the lubricant oil depends on the temperature of the lubricant oil, that is, when the temperature of the lubricant oil increases, the viscosity of the lubricant oil decreases, and when the temperature of the lubricant oil decreases, the viscosity of the lubricant oil increases.

Therefore, the temperature of the lubricant oil for the bearing of each of the electrical power generators is controlled so as to always be a rated value (appropriate operation condition) specified for each of the electrical power generators.

The abrasion of the bearing can be controlled by adjusting the sliding area of the bearing, but there is a trade-off also for this approach from the viewpoint of the loss of the electrical power generator.

See Patent Document 1 and Patent Document 2 as prior art references disclosing techniques related to the present invention.

CITATIONS LIST

Patent Documents

Patent DOCUMENTS 1: JP 2001-297973 A
Patent DOCUMENTS 2: JP 2016-153669 A

SUMMARY OF INVENTION

Technical Problems

When electrical power generators are independently used, appropriate operation conditions (rated conditions) specified for the bearing of each of the electrical power generators are maintained. For example, the temperature of lubricant oil is controlled to satisfy a temperature condition (rated temperature condition) specified for each of the bearings so that abrasion of the bearing can be reduced as much as possible while a bearing loss is reduced.

However, as a result of a study by the present inventors, a question has arisen as to whether or not, when a plurality of electrical power generators cooperate under certain conditions, for example, when the electrical power generators are provided for their respective corresponding branch channels for water from a dam as in a hydroelectric power station, it is appropriate to fix the temperature of lubricant oil for the bearing of each of the electrical power generators to a rated condition.

Usually, the electrical power generators provided for the branch channels are of the same type, and therefore lubricant oils for the bearings of these electrical power generators are adjusted to the same temperature. However, according to a study by the present inventors, there is a case where a difference in bearing loss occurs between the bearings of electrical power generators provided around the same time even when the temperature of lubricant oil and other operation conditions previously specified are the same. As a result, abrasion of the bearings also unevenly progresses, and therefore some of the bearings need to be replaced before periodic maintenance. On the other hand, some of the bearings are replaced at the time of periodic maintenance irrespective of the fact that they are sufficiently usable due to slow progression of abrasion. The cause for this situation is not clear, but may be a subtle difference in water flow or flow rate among the branch channels. Another cause may be a difference in environment, such as temperature, that depends on the place of installation in a hydroelectric power station.

Whatever the case, it is certain that when a plurality of bearings operate simultaneously or in association with each other, it is not sufficient that each of the bearings is simply operated under its optimum conditions as a whole. There is a possibility that so-called the fallacy of composition has occurred. Such a tendency is considered to be high when a plurality of bearings operate nearby.

Solutions to Problems

The present inventors have found such a problem and thought that, for example, the loss of energy and the change of abrasion (degree of progression of abrasion) in the bearing of each of the electrical power generators as indexes do not only depend on the operation conditions of only the bearing but are also associated with the operation conditions of the other bearings.

A typical example in which two electrical power generators operate in parallel will be described below. The temperature of lubricant oil for the bearings (bearing A, bearing B) of each of the electrical power generators as an operation condition is fixed to a rated value, and the loss (standard loss LR1, LR2) of each of the bearing A and the bearing B is determined by calculating the power consumption of the bearing (Pattern #1). On the other hand, the temperature of the lubricant oil for the bearing B is changed to a rated value+α (the temperature of the lubricant oil for the bearing A is fixed to a rated value), and the loss of each of the bearings is determined (Pattern #2). In the following Table 1, various sets of the temperature of the lubricant oil supplied to the bearing A (temperature A) and the temperature of the lubricant oil supplied to the bearing B (temperature B) are shown. The temperatures of the lubricant oils are controlled according to the nine patterns, and the bearings are operated for a predetermined period of time. The average loss of each of the bearings at that time is determined. When larger than the standard loss LR1 or LR2, the loss of each of the bearings is represented as (+), and when smaller than the standard loss LR1 or LR2, the loss of each of the bearings is represented as (−). The degree of the loss is represented as the number of the signs. Table 1 shows an example.

TABLE 1

| Patterns | Temperature A | Temperature B | Loss of bearing A | Loss of bearing B |
|---|---|---|---|---|
| #1 | Rated value | Rated value | LR1 | LR2 |
| #2 | Rated value | Rated value + α | − | −− |
| #3 | Rated value + α | Rated value | − | |
| #4 | Rated value + α | Rated value + α | −− | −− |
| #5 | Rated value | Rated value − α | + | ++ |
| #6 | Rated value − α | Rated value | + | |
| #7 | Rated value − α | Rated value − α | ++ | ++ |
| #8 | Rated value + α | Rated value − α | − | ++ |
| #9 | Rated value − α | Rated value + α | +++ | −− |

In Table 1,

Temperature A represents the temperature of the lubricant oil for the bearing A, and Temperature B represents the temperature of the lubricant oil for the bearing B.

From the results shown in Table 1, the temperature of the lubricant oil for each of the bearings is preferably controlled according to Pattern #2 or Pattern #4. That is, the total sum of losses of the bearings is preferably a predetermined threshold value or less, that is, in the case of Table 1, (2−) or less (the number of (−) signs is 2 or less).

In the above-described example, when the total sum of losses of the bearing A and the bearing B is (2+) or more (the number of (+) signs is 2 or more), the electrical power generating capacity is reduced. Therefore, it is preferred that such operation patterns are not adopted to actually control a bearing system. The execution of such an operation pattern can be stopped at the time when a loss exceeding the predetermined threshold value is measured. This threshold value can freely be set. For example, a threshold value can be set for the total sum of losses of the bearing A and the bearing B or for the loss caused by each of the bearings.

In the above example, the sign (+) and the sign (−) representing the loss of each of the bearings can be added. For example, in the case of Pattern #8 in which the loss of the bearing A is (−) and the loss of the bearing B is (+)(+), the total sum of the losses is (+).

On the other hand, from the viewpoint of the maintenance of the bearings, attention should be paid to the degree of progression of abrasion of the bearings. When the two bearings operate in parallel, the temperature condition of the lubricant oil for each of the bearings is fixed to a rated value, and the degree of progression of abrasion of the bearing of each of the electrical power generators (standard degree of progression AR1, AR2) is measured (Pattern #1). On the other hand, the temperature of the lubricant oil for the bearing B is changed to a rated value+α (the temperature of the lubricant oil for the bearing A is fixed to a rated value), and the degree of progression of abrasion of each of the bearings is measured (Pattern #2). In the following Table 2, various sets of the temperature of the lubricant oil supplied to the bearing A (Temperature A) and the temperature of the lubricant oil supplied to the bearing B (Temperature B) are shown. The temperatures of the lubricant oils are controlled according to the nine patterns, and the bearings are operated for a predetermined period of time. The degree of progression of abrasion of each of the bearings at that time is measured. When larger than the standard degree of progression AR1 or AR2, the degree of progression of each of the bearings is represented as (+), and when smaller than the standard degree of progression AR1 or AR2, the degree of progression of each of the bearings is represented as (−). The magnitude of the degree is represented as the number of the signs. Table 2 shows an example.

TABLE 2

| Patterns | Temperature A | Temperature B | Degree of progression of abrasion A | Degree of progression of abrasion B |
|---|---|---|---|---|
| #1 | Rated value | Rated value | AR1 | AR2 |
| #2 | Rated value | Rated value + α | + | ++ |
| #3 | Rated value + α | Rated value | + | |
| #4 | Rated value + α | Rated value + α | ++ | ++ |
| #5 | Rated value | Rated value − α | − | −− |
| #6 | Rated value − α | Rated value | − | |
| #7 | Rated value − α | Rated value − α | −− | −− |
| #8 | Rated value + α | Rated value − α | + | −− |
| #9 | Rated value − α | Rated value + α | −−− | ++ |

In Table 2,

Temperature A represents the temperature of the lubricant oil for the bearing A, Temperature B represents the temperature of the lubricant oil for the bearing B, Degree of progression of abrasion A represents the degree of progression of abrasion of the bearing A, and Degree of progression of abrasion B represents the degree of progression of abrasion of the bearing B.

Here, assuming that the abrasion of the bearing A has progressed ahead of schedule, and the abrasion of the bearing B has progressed as scheduled.

Under such conditions, when the timing of maintenance of the bearings performed by stopping the electrical power generators has already been fixed and the maintenance will be performed before long, Pattern #9 is preferably selected to intensively reduce the progression of abrasion of the bearing A at the expense of the progression of abrasion of the bearing B. On the other hand, when there is still lots of time until the maintenance, Pattern #6 may be selected to give priority to reducing the progression of abrasion of the bearing A.

In the above example, it is easily conceivable that numerous patterns can be achieved by adjusting the amount of temperature change α. In other words, from the viewpoint of controlling the degree of progression of abrasion of each of the bearings, the amount of change α is preferably set so that the degree of progression of abrasion of each of the bearings changes.

Here, the degree of progression of abrasion can be digitized, which makes it possible to precisely control the progression of abrasion. For example, when a bearing of interest does not have a sufficient thickness before maintenance, an operation condition A and an operation condition B are set to give priority to reducing the progression of abrasion of the bearing to prevent the thickness of the bearing of interest from becoming lower than its lower limit to avoid the necessity of replacement before maintenance. Here, the condition for promoting the abrasion of the bearing reduces the loss of a device having the bearing. Therefore, when the bearing is required to be replaced at the time of maintenance, abrasion of the bearing may purposely be promoted to, as well as, reduce loss of the bearing to achieve high performance.

The relationship shown in Table 1, that is, the relationship of the operation condition A of the bearing A (Temperature A of lubricant oil) and the operation condition B of the bearing B (Temperature B of lubricant oil) to the index (loss) of each of the bearings at the time when these operation conditions are executed is referenced, for example, when the electrical power generators operate in normal operation mode. This is because it is desirable to reduce the loss as much as possible in normal operation mode to operate the electrical power generators at a high level of performance.

On the other hand, the relationship shown in Table 2 is referenced, for example, when the timing of maintenance is taken into consideration, and is therefore preferably applied to relatively short-term operation.

The present invention has been completed on the basis of the above findings obtained by the present inventors.

More specifically, one aspect of the present invention is defined as follows.

A bearing system including: a bearing A and a measurement execution unit A therefor; a bearing B and a measurement execution unit B therefor; and a control unit that controls the measurement execution unit A and the measurement execution unit B, wherein the measurement execution unit A comprises:

a measurement unit A that measures an index that indicates a usage state of the bearing A; and an operation condition execution unit A that executes an operation condition A that is imposed on the bearing A and influences the usage state of the bearing A, the measurement execution unit B comprises:

a measurement unit B that measures an index that indicates a usage state of the bearing B; and an operation condition execution unit B that executes an operation condition B that is imposed on the bearing B and influences the usage state of the bearing B, the control unit comprises:

an instruction storage unit that stores a plurality of sets of the operation condition A and the operation condition B and an index A and an index B obtained from the bearing A and the bearing B respectively when the operation condition A and the operation condition B are executed; and a control section that controls the operation condition execution unit A and the operation condition execution unit B on a basis of contents stored in the instruction storage unit to control the index of the bearing A and the index of the bearing B so that their respective given targets are achieved, the measurement execution unit A, the measurement execution unit B, and the control unit are connected through communication link, and measured indexes and executed operation conditions are sent from the measurement execution unit A and the measurement execution unit B to the control unit through the communication link.

In the above bearing system, as the index that indicates the usage state of each of the bearing A and the bearing B, a loss caused by each of the bearings and the degree of progression of abrasion of the bearing can be used.

The loss of the bearing results from the dynamic friction coefficient between the bearing and a rotation shaft. When the loss increases, the bearing itself has heat, and therefore the loss can be determined by measuring the heat. Therefore, what is to be directly measured by each of the measurement unit A and the measurement unit B is the temperature of the bearing. Depending on the shape or structure of the bearing, the temperature of the sliding part or back part of the bearing can be measured. On the basis of the thus measured temperature, the loss is calculated according to a predetermined rule. What is to be measured is not limited to the temperature of the bearing. For example, the temperature of a case including the bearing or the temperature of lubricant oil after cooling the bearing may be measured. Further, the target to be measured is not limited to temperature, and another index factor such as vibration may be measured.

The degree of progression of abrasion can be obtained from the change of thickness of the bearing with respect to time. What is to be directly measured by each of the measurement unit A and the measurement unit B is the thickness of the bearing for which the measurement unit A or the measurement unit B is responsible. It is preferred that the thickness of a pad used for the sliding part is measured. When the relationship between the degree of progression of abrasion and the temperature of the bearing itself has been determined, it is possible to indirectly determine the degree of progression of abrasion from the log (time and temperature) of temperature of the bearing itself (e.g., the temperature of the back surface of the bearing). What is to be measured is not limited to the above. For example, the distance between the bearing and an object to be slid may be measured.

It is preferred that an alarm is set to be output when the index exceeds a predetermined value. The alarm may be output according to an AI prediction using stored data.

In addition to the measurement unit of the measurement execution unit, an additional measurement unit that measures an environmental factor not related to the usage state of the bearing may be connected to the control unit. When the additional measurement unit is, for example, a vibration sensor or a weather information receiving device, an instruction for stopping the bearing system or evacuating the bearing can be sent to the measurement execution unit.

On the other hand, in the above bearing system, as the operation condition A and the operation condition B, the abrasion condition or temperature condition of each of the bearings can be adopted. As the abrasion condition, one or more of the temperature or viscosity of lubricant oil supplied to the bearing, the sliding area of the bearing, and the position of the bearing are preferably adjusted. As the temperature condition, the flow rate of lubricant oil supplied to the bearing or an environmental factor such as the surrounding temperature of the bearing is preferably adjusted.

When a thrust bearing is used as the bearing, the sliding area of the bearing can be controlled by adjusting the number of pads constituting the bearing, that is, by allowing a desired pad(s) to be spaced from the rotation shaft.

When the bearing is air-cooled, the temperature of the lubricant oil can be controlled by controlling the amount of air. For example, the amount of air can be controlled by changing the angle of a fan provided on the rotation shaft. Further, when a radiator is provided for the lubricant oil, the temperature of the lubricant oil can be adjusted by adjusting the flow rate of the lubricant oil flowing through the radiator. They may be used in combination.

It is to be noted that the temperature of the lubricant oil may be determined by directly measuring the temperature of the lubricant oil itself or may indirectly be determined from the temperature of the bearing or a radiator-related part. When the temperature of the flowing lubricant oil is directly measured, the temperature of the lubricant oil located upstream or downstream of the bearing may be measured depending on the shape or structure of the bearing.

As the index, a load applied to the rotation shaft corresponding to each of the bearings (in the case of an electrical power generator or the like) may be adopted, and as the operation condition, a load applied by the rotation shaft (in the case of a pump or the like) may be adopted. This is because when a load changes, a burden placed on the bearing changes so that the degree of progression of abrasion of the bearing and the loss also change.

The change of each of the indexes cannot always be measured immediately after changing the operation condition. According to a study by the present inventors, there is a case where it takes 10 to 30 days to test each pattern. Therefore, the administrator of this bearing system systematically changes the operation condition imposed on each of the bearings and records the log of each of the indexes obtained at that time. After the logs of all the assumed patterns are recorded, the relationship between the operation condition that should be imposed on each of the bearings and the index of each of the bearings at the time when the operation condition is executed can be determined from the obtained logs. In this way, a so-called testing stage for data collection is completed.

It is to be noted that when the number of bearings increases, the number of patterns in a table showing the patterns of combination of the operation condition and the index increases. The same is true when the value of ±α varies or the variety of operation conditions is increased. In such a case, a burden caused by recording the logs of all the patterns tends to increase, and therefore an operator needs to make a test plan for data collection with reference to past examples and examples of other bearing systems. At this time, the operator can easily refer to the data of past examples and examples of other bearing systems when the data is intensively managed by the control unit as a server. If necessary, the table may be updated before use. Particularly, when the number of patterns is large, irrespective of whether or not the bearing system is in a testing stage, AI is preferably used to determine the content of an instruction to be sent to the measurement execution unit, more specifically, the value of the operation condition for controlling the operation condition execution unit and executing measurement.

The present invention can be understood also as an invention of a method, and therefore another aspect of the present invention is defined as follows.

A control method for a bearing A and a bearing B in a bearing system comprising: the bearing A and a measurement execution unit A therefor; the bearing B and a measurement execution unit B therefor; and a control unit that controls the measurement execution unit A and the measurement execution unit B, wherein the measurement execution unit A comprises:
a measurement unit A that measures an index that indicates a usage state of the bearing A; and
an operation condition execution unit A that executes an operation condition A that is imposed on the bearing A and influences the usage state of the bearing A, and the measurement execution unit B comprises:
a measurement unit B that measures an index that indicates a usage state of the bearing B; and
an operation condition execution unit B that executes an operation condition B that is imposed on the bearing B and influences the usage state of the bearing B; wherein the control method comprising the steps of:
storing, in an instruction storage unit, a plurality of sets of the operation condition A and the operation condition B and an index A and an index B obtained from the bearing A and the bearing B respectively when the operation condition A and the operation condition B are executed; and controlling the operation condition execution unit A and the operation condition execution unit B on a basis of contents stored in the instruction storage unit to control the index of the bearing A and the index of the bearing B so that their respective given targets are achieved.

According to the control method of this aspect defined as above, as in the case of the first aspect, when a plurality of bearings operate simultaneously or in association with each other so that it is not sufficient that each of the bearings is simply operated under its rated conditions, an operation condition that should be imposed on each of the bearings can be determined. In other words, it is possible to optimize not the performance of each of the plurality of bearings but the total performance of the plurality of bearings.

Another aspect of the present invention is defined as follows. A computer program that controls a bearing A and a bearing B in a bearing system comprising: the bearing A and a measurement execution unit A therefor; the bearing B and a measurement execution unit B therefor; and a control unit that controls the measurement execution unit A and the measurement execution unit B, wherein the measurement execution unit A comprising:
a measurement unit A that measures an index that indicates a usage state of the bearing A; and
an operation condition execution unit A that executes an operation condition A that is imposed on the bearing A and influences the usage state of the bearing A, and the measurement execution unit B includes:
a measurement unit B that measures the index that indicates a usage state of the bearing B; and
an operation condition execution unit B that executes an operation condition B that is imposed on the bearing B and influences the usage state of the bearing B, the computer program allowing a computer to execute the steps of:
storing, in an instruction storage unit, a plurality of sets of the operation condition A and the operation condition B and an index A and an index B obtained from the bearing A and the bearing B respectively when the operation condition A and the operation condition B are executed; and controlling the operation condition execution unit A and the operation condition execution unit B with reference to contents stored in the instruction storage unit to control the index of the bearing A and the index of the bearing B so that their respective given targets are achieved.

The computer program according to this aspect defined as above makes it possible to operate the bearing system defined in another aspect and to perform the control method therefor defined in another aspect using a general-purpose computer device.

From the above description, the present invention can be understood as follows. A bearing system comprising: a bearing A and a measurement execution unit A therefor; a bearing B and a measurement execution unit B therefor; and a control unit that controls the measurement execution unit A and the measurement execution unit B, wherein the control unit sends instructions to the measurement execution unit A and the measurement execution unit B so that performance required of the bearing system can be achieved, and the measurement execution unit A, the measurement execution unit B, and the control unit are connected through communication link. That is, the control unit in the present invention sends, to each of the measurement execution units, an instruction to allow each of the bearings to offer performance such that the bearing system is optimized as a whole.

DESCRIPTION OF EMBODIMENT

Figure 1:
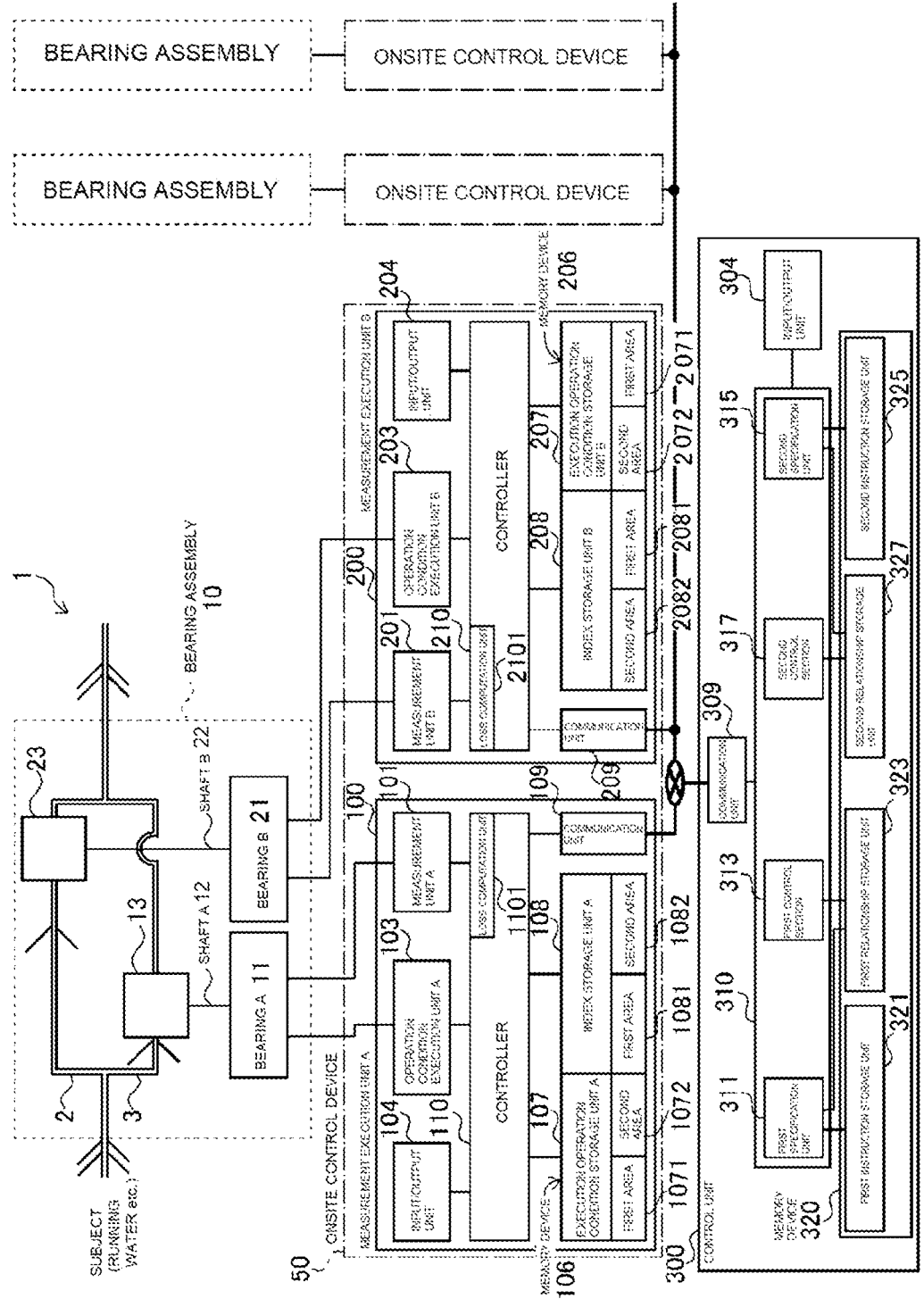
FIG. 1 is a block diagram showing the structure of a bearing system according to an embodiment of the present invention.

The structure of a bearing system 1 according to an embodiment of the present invention is shown in FIG. 1.

The bearing system 1 controls bearings of electrical power generators provided in a hydroelectric power station. FIG. 1 shows a case where two electrical power generators are used in a hydroelectric power station for ease of explanation.

This bearing system 1 includes a bearing assembly 10 and an onsite control device (field control device) 50 which are provided on-site in the hydroelectric power station, and a control unit 300 that serves as a server connected to the onsite control device 50 as a client through the Internet or a dedicated communication line.

In the present embodiment, the bearing assembly 10 includes two bearings (bearing A11, bearing B21), and the bearing A11 and the bearing B21 are of a vertical type and slidably support a shaft A12 and a shaft B22 as rotators of the electrical power generators, respectively.

In the hydroelectric power station, water from a dam is divided and allowed to flow into two branch channels 2 and 3. The water flowing through the branch channel 2 is received by a propeller 13 of the bearing A12 so that the shaft 12 rotates. The water flowing through the branch channel 3 is received by a propeller 23 of the bearing B22 so that the shaft 22 rotates.

It is to be noted that the bearing herein refers to a bearing device (also referred to as a bearing unit) equipped with a sliding part, such as pads, and other incidental facilities.

The onsite control device 50 includes a measurement execution unit A100 and a measurement execution unit B200.

The measurement execution unit A100 is connected to the bearing A11. A measurement unit A101 of the measurement execution unit A100 measures the temperature of a back surface of the bearing A11 to determine a loss as a first index. This measurement can use a resistance temperature detector-type thermometer such as RTD or a thermocouple-type thermometer. The thus measured temperature is sent to a loss computation unit 1101 of a controller 110. The loss computation unit 1101 calculates the loss of the bearing A from the temperature of the bearing A on the basis of a predetermined rule. The calculated loss of the bearing A is stored in a first area 1081 of an index storage unit A108 together with the time when the temperature was measured. In order to reduce the load of the measurement execution unit A100, the temperature may directly be stored as data in the first area 1081 without calculating the loss in the measurement execution unit A100. The loss can be calculated in the control unit 300.

The measurement unit A101 measures the thickness of the bearing A11 to determine the degree of progression of abrasion of the bearing as a second index. This measurement can use an optical sensor. The measured thickness of the bearing A11 is stored in a second area 1082 of the index storage unit A108 together with measurement time. A value obtained by dividing the change of the thickness by elapsed time represents the degree of progression of abrasion.

An operation condition execution unit A103 adjusts the temperature of lubricant oil supplied to the bearing A11.

Figure 2:
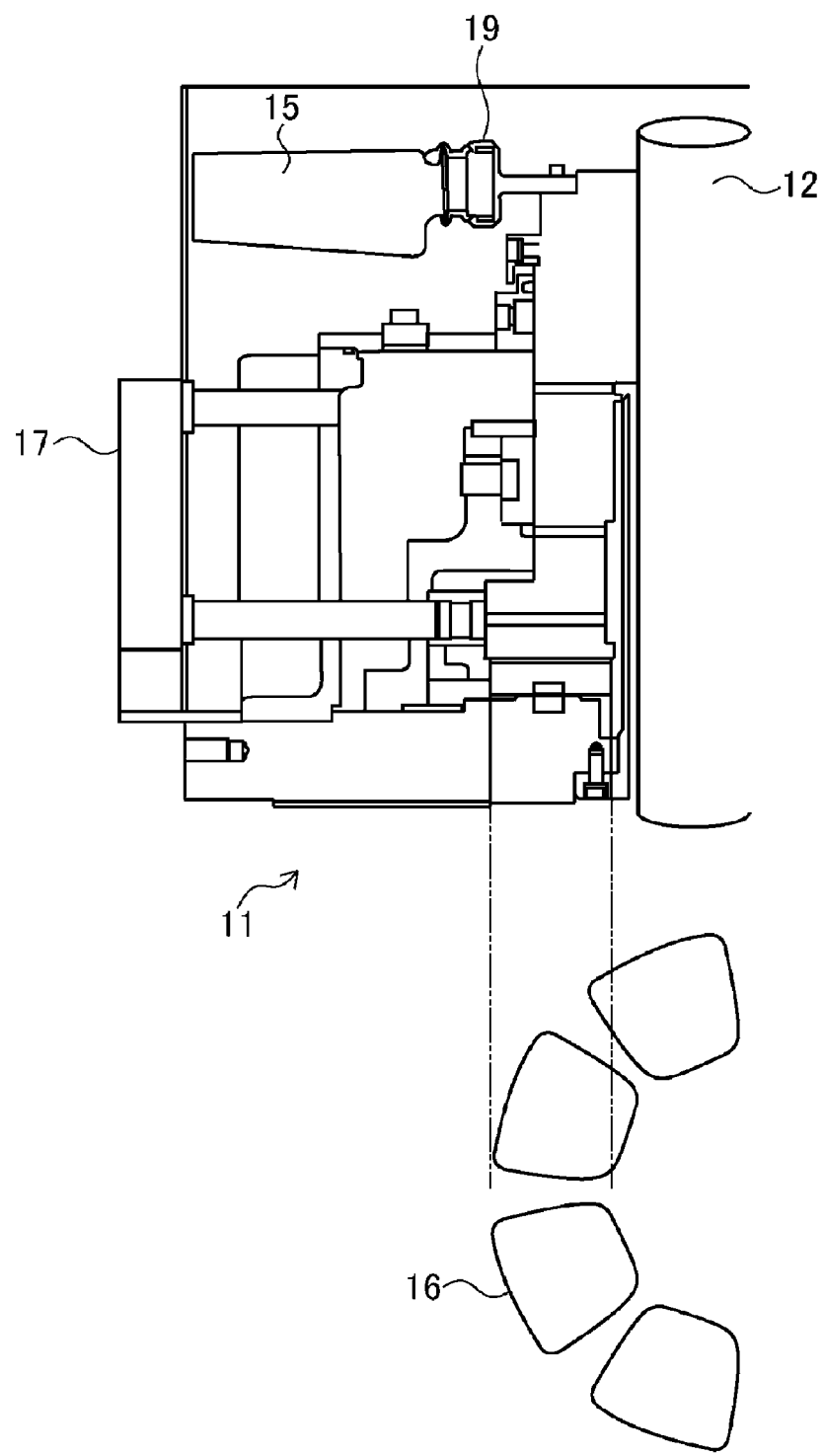
FIG. 2 is a sectional view showing the structure of a bearing.

FIG. 2 shows the bearing A11. In FIG. 2, reference sign 12 denotes the shaft A, and a fan 15 is attached to the shaft A12. In the present embodiment, the bearing A11 having a thrust-type sliding part includes a plurality of divided thrust pads (hereinafter, also referred to as pads) 16, and lubricant oil is supplied to the surface of the pads 16. This lubricant oil is circulated between a radiator 17 and the pads 16. The thrust pads 16 are supported by an actuator (not shown) that can receive a signal from the operation condition execution unit A103, and the distance between the thrust pads and the thrust collar of the shaft A12 can be adjusted to select a sliding contact mode or a separation mode. The measurement unit A101 measures the thickness of the pads 16.

The abrasion of the pads 16 of the bearing A11 can be adjusted by controlling the distance between the thrust collar of the shaft A12 and the pads 16 of the bearing A11 with a jacking system.

The operation condition execution unit A103 sends a signal to adjust the fan angle of the fan 15 that rotates together with the shaft A12. An angle adjusting device 19 receives the signal and changes the angle of the fan 15. Wind from the fan 15 is sent to the radiator 17. That is, the volume of air from the fan 15 depends on the angle of the fan 15, and the ability of the radiator 17 to cool the lubricant oil is adjusted by the volume of air.

It is to be noted that the signal output from the operation condition execution unit A103 may directly be set by an input/output unit 104 provided in the measurement execution unit A100, or may be set by remote operation through the control unit 300.

The operation condition execution unit A103 can also send a signal to select the mode of the thrust pads 16 (sliding contact mode, separation mode) to the actuator supporting the thrust pads 16.

When the number of the thrust pads 16 that are in slide-contact with the shaft A12 is larger, that is, when the total sliding area is larger, the abrasion of the pads is less likely to progress, but on the other hand, sliding resistance against the shaft A12 increase so that the loss thereof increases.

The operation condition execution unit A103 may adjust both the angle of the fan 15 (i.e., the temperature of lubricant oil) and the number of the thrust pads 16 (i.e., the sliding area of the bearing).

The input/output unit 104 includes an input device such as a keyboard or a pointer and an output device such as a display or a printer. The operator can also send a command signal to the operation condition execution unit A103 through the input device, and the operation condition execution unit A103 outputs a signal value in response to the command signal. Then, the signal value can be stored in a first area 1071 of an execution operation condition storage unit A107 in a memory device 106.

Reference sign 109 denotes a communication unit, and the communication unit serves as a communication interface for the measurement execution unit A100.

The command signal to the operation condition execution unit A103 is sent from the control unit 300 through the communication unit 109. Also in this case, the content of the command signal can be stored in the first area 1071 of the execution operation condition storage unit A107.

Reference sign 110 denotes a controller, and a general-purpose computer device is used as the controller. A control program for this controller 110 is also stored in the memory device 106.

The areas in the memory device 106 which store data related to the measured indexes and data related to the operation condition may be omitted, in which case the function of the areas can be performed by predetermined areas of a memory device 320 in the control unit 300.

The measurement execution unit B200 is connected to the bearing B21. The operation of each component of this measurement execution unit B200 is the same as that of each component of the measurement execution unit A100 except that a target therefor is the bearing B21. Therefore, the components of the measurement execution unit A100 and the components of the measurement execution unit B200 which perform the same operation are denoted by the same reference signs except for the highest-order digit, and the description thereof will not be repeated.

The control unit 300 is far from the hydroelectric power station, and is connected to the measurement execution unit A and the measurement execution unit B through the Internet. A communication unit 309 serves as a communication interface therefor.

The data of a first operation condition A of the bearing A11 (an operation condition imposed on the bearing A11 by the operation condition execution unit A103, i.e., the temperature A of lubricant oil supplied to the bearing A11 and operation time) stored in the first area 1071 of the execution operation condition storage unit A107 in the memory device 106 of the measurement execution unit A100, the data of a first index A of the bearing A11 (loss A and loss A determination time) stored in the first area 1081 of the index storage unit A108 in the memory device 106 of the measurement execution unit A100, the data of a first operation condition B of the bearing B21 (an operation condition imposed on the bearing B21 by the operation condition execution unit B203, i.e., the temperature B of lubricant oil supplied to the bearing B21 and operation time) stored in a first area 2071 of an execution operation condition storage unit B207 in a memory device 206 of the measurement execution unit B200, and the data of a first index B of the bearing B21 (loss B and loss B determination time) stored in a first area 2081 of an index storage unit B208 in the memory device 206 of the measurement execution unit B200 are sent to a first instruction storage unit 321 of the memory device 320 in the control unit 300 through the Internet.

Therefore, the data of the temperature A of lubricant oil supplied to the bearing A11 and operation time as the first operation condition A of the bearing A11, the data of the loss A of the bearing A11 and determination time as the first index A obtained from the bearing A11 when the first operation condition A is executed, the data of the temperature B of lubricant oil supplied to the bearing B21 and operation time as the first operation condition B of the bearing B21, and the data of the loss B of the bearing B21 and determination time as the first index B obtained from the bearing B21 when the first operation condition B is executed are stored in the first instruction storage unit 321.

The set of the data is formed for, for example, each of the patterns shown in Table 1 and stored in the first instruction storage unit 321.

From each of the data sets stored in the first instruction storage unit 321, a first specification unit 311 of a controller 310 determines, for each of the patterns, the relationship among the temperature A of lubricant oil supplied to the bearing A11, the temperature B of lubricant oil supplied to the bearing B21, the loss (average) of the bearing A11, and the loss (average) of the bearing B21 at the time when the bearing A11 is operated under the first operation condition A and the bearing B21 is operated under the first operation condition B for, for example, 20 days.

More specifically, the loss is determined at predetermined intervals from the time when lubricant oil adjusted to the predetermined temperature of each pattern was supplied to each of the bearings and the temperature of back surface of the bearing measured at the time closest to the above time (preferably at the same time), and the average of determined values of the loss is calculated.

The relationship determined by the first specification unit 311 is stored as a first relationship in a first relationship storage unit 323. More specifically, in the first relationship storage unit 323, the temperatures as the operation conditions and the average losses as the indexes of the bearing A11 and the bearing B21 at the time when the operation conditions are executed are stored for each of the patterns of the first operation condition A and the first operation condition B.

The data of the temperature A of lubricant oil supplied to the bearing A11 and time as the first operation condition A of the bearing A11, the data of a thickness A of the bearing A11 and operation time as a second index A obtained from the bearing A11 when the first operation condition A is executed, the data of the temperature B of lubricant oil supplied to the bearing B21 and determination time as the first operation condition B of the bearing B21, and the data of a thickness B of the bearing B21 and time as a second index B obtained from the bearing B21 when the first operation condition B is executed are stored in a second instruction storage unit 325.

The set of data is formed for, for example, each of the patterns shown in Table 2 and stored in the second instruction storage unit 325.

From each of the data sets stored in the second instruction storage unit 325, a second specification unit 315 of the controller 310 determines, for each of the patterns, the relationship among the temperature A of lubricant oil supplied to the bearing A11, the temperature B of lubricant oil supplied to the bearing B21, the degree of progression of abrasion of the bearing A11, and the degree of progression of abrasion of the bearing B at the time when the bearing A11 is operated under the first operation condition A and the bearing B21 is operated under the first operation condition B for, for example, 20 days.

More specifically, the degree of progression of abrasion of each of the bearings is calculated from the difference between the thickness of the bearing at the time of start of execution of the operation condition and the thickness of the bearing at the time of the end of the execution. The relationship between the result of the calculation, that is, the degree of progression of abrasion of each of the bearings and the temperature of lubricant oil supplied to each of the bearings defined for each of the patterns is determined. It is to be noted that the temperature of lubricant oil supplied to each of the bearings is preferably maintained for a predetermined period of time (in this case, 20 days) to calculate the degree of progression of abrasion.

The relationship determined by the second specification unit 315 is stored as a second relationship in a second relationship storage unit 327. More specifically, in the second relationship storage unit 327, the temperatures as the operation conditions and the degrees of progression of abrasion as the indexes of the bearing A11 and the bearing B21 are stored for each of the patterns of the first operation condition A and the first operation condition B.

Reference sign 304 denotes an input/output unit, and the input/output unit includes an input device such as a keyboard or a pointer and an output device such as a display or a printer. The operator can monitor the usage state (loss, bearing thickness) of the on-site bearing A11 and the usage state (loss, bearing thickness) of the on-site bearing B21 via the monitor. The outputs of sensors attached to the sliding part or supporting part of the bearing, the incidental facilities of the bearing, and the electrical power generator itself can also be remotely monitored.

Further, when the first operation condition A and the first operation condition B are input through the input/output unit 304, a first control section 313 sends a command signal to the operation condition execution unit A103 of the measurement execution unit A100. The operation condition execution unit A103 can perform, on the bearing A11, an instruction corresponding to the command signal, that is, an instruction given by the operator through the input/output unit 304 by remote control.

The controller 310 includes a general-purpose computer that controls each of components constituting the control unit 300, and a control program for the controller 310 is stored in the memory device 320.

Figure 3:
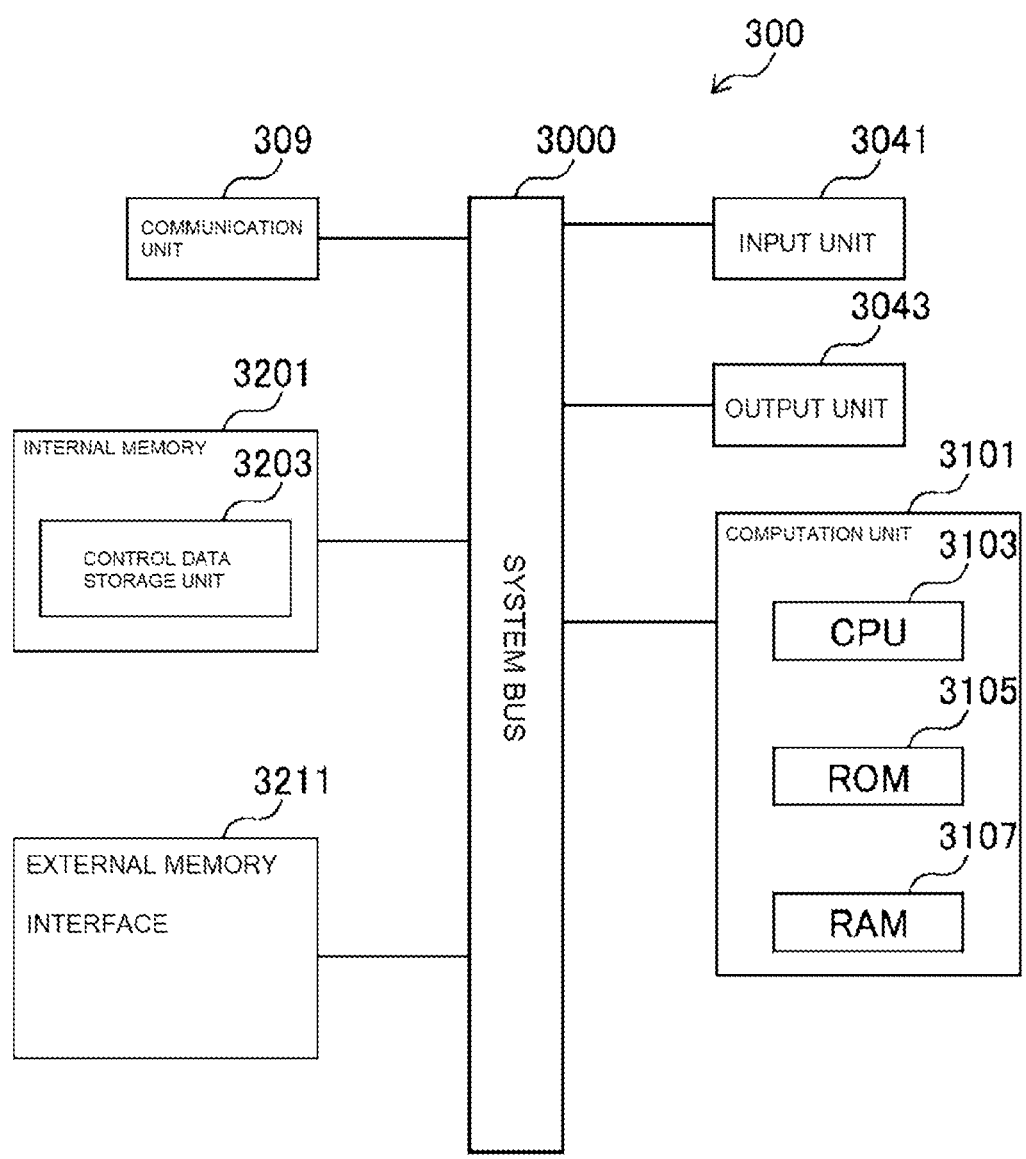
FIG. 3 is a diagram showing the structure of hardware of a control unit 300.

FIG. 3 shows the structure of hardware of the control unit 300.

The control unit 300 includes a general computer device in which a communication unit 309, an input unit 3041, an output unit 3043, a computation unit 3101, an internal memory 3201, and an external memory interface 3211 are connected through a system bus 3000.

The communication unit 309 is a data input/output interface for an external communication link, and is operated by a general-purpose communication protocol.

The input unit 3041 includes a general input device such as a keyboard or a pointer.

The output unit 3043 includes a printer, a display or the like.

The computation unit 3101 includes a CPU 3103, a ROM 3105, and a RAM 3107, functions as the first specification unit 311, the first control section 313, the second specification unit 315, and a second control section 317, and controls the entire system of the control unit 300. The ROM 3105 includes a nonvolatile memory that stores a control program to control the computation unit 3101 etc. The RAM 3107 rewritably stores various parameters etc., previously set by the operator through the input unit 3041 and provides a working area for the CPU 3103. The control program to control the computation unit 3101 is stored in the ROM 3105, but may be stored in the RAM 3107 or the internal memory 3201.

The internal memory 3201 may be of HDD type or SSD type. A control data storage unit 3203 of the internal memory 3201 is used as the first instruction storage unit 321, the first relationship storage unit 323, the second instruction storage unit 325, and the second relationship storage unit 327. As a so-called buffer memory that temporarily stores data, the RAM 3107 of the computation unit 3101 can be used.

Reference sign 3211 denotes an external memory interface, and an external memory (e.g., a USB memory, a hard disk memory) is detachably attached through this interface.

Figure 4:
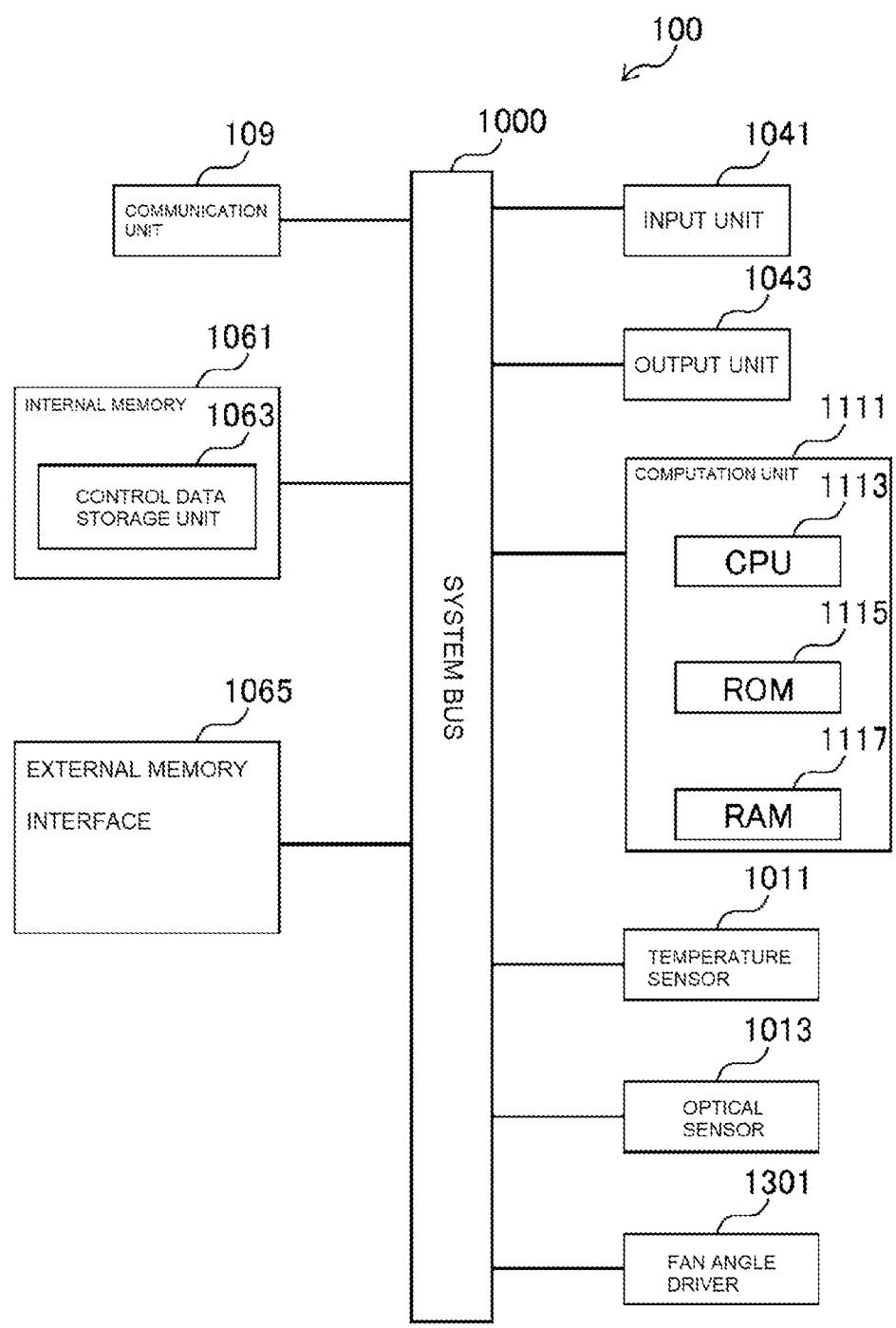
FIG. 4 is a diagram showing the structure of hardware of a measurement execution unit 100.

Similarly, FIG. 4 shows the structure of hardware of the measurement execution unit A100.

The measurement execution unit A100 includes a general computer device in which the communication unit 109, an input unit 1041, an output unit 1043, a computation unit 1111, an internal memory 1061, an external memory interface 1065, a temperature sensor 1011, an optical sensor 1013, and a fan angle driver 1301 are connected through a system bus 1000.

The communication unit 109 is a data input/output interface for an external communication link, and is operated by a general-purpose communication protocol.

The input unit 1041 includes a general input device such as a keyboard or a pointer.

The output unit 1043 includes a printer, a display or the like.

The computation unit 1111 includes a CPU 1113, a ROM 1115, and a RAM 1117, can function also as the loss computation unit 1101, and controls the entire system of the measurement execution unit A100. The ROM 1115 includes a nonvolatile memory that stores a control program etc. to control the computation unit 1111. The RAM 1117 rewritably stores various parameters etc. previously set by the operator through the input unit 1041, and provides a working area for the CPU 1113. The control program to control the computation unit 1111 is stored in the ROM 1115, but may be stored in the RAM 1117 or the internal memory 1061.

The internal memory 1061 may be of HDD type or SSD type. A control data storage unit 1063 of the internal memory 1061 is used as the execution operation condition storage unit A107 and the index storage unit A108. As a so-called buffer memory that temporarily stores data, the RAM 1117 of the computation unit 1111 can be used.

Reference sign 1065 denotes an external memory interface, and an external memory (e.g., a USB memory, a hard disk memory) is detachably attached through this interface.

The temperature sensor 1011 and the optical sensor 1013 function as the measurement unit A101, and measure the temperature of back surface (non-sliding surface) of the pads 16 of the bearing A11 and the thickness of the pads 16, respectively.

The fan angle driver 1301 as the operation condition execution unit A103 sends a command signal to the angle adjusting device 19 to change the angle of the fan 15 that rotates together with the shaft A12.

Next, the operation of the bearing system 1 will be described on the basis of FIG. 5.

Soon after setting up the bearing system 1 in the hydroelectric power station, the bearing A11 and the bearing B21 are operated under their original rated operation condition (the temperature of lubricant oil supplied to the sliding part of the bearing) (Step S1). The rated operation condition of the bearing A11 (the temperature of lubricant oil supplied to the sliding part of the bearing) is stored in the first area 1071 of the execution operation condition storage unit A107 together with the time when the rated operation condition was executed, and the rated operation condition of the bearing B21 (the temperature of lubricant oil supplied to the sliding part of the bearing) is stored in the first area 2071 of the execution operation condition storage unit B207 together with the time when the rated operation condition was executed (Step S3).

The operation under the rated condition is continuously performed for 20 days.

In Step S5, the loss (first index) and the degree of progression of abrasion (second index) of each of the bearing A11 and the bearing B21 at the time when the test operation is performed under the conditions set in Step S1 (see Pattern #1 in Table 1 and Table 2) are measured and stored.

Figure 6:
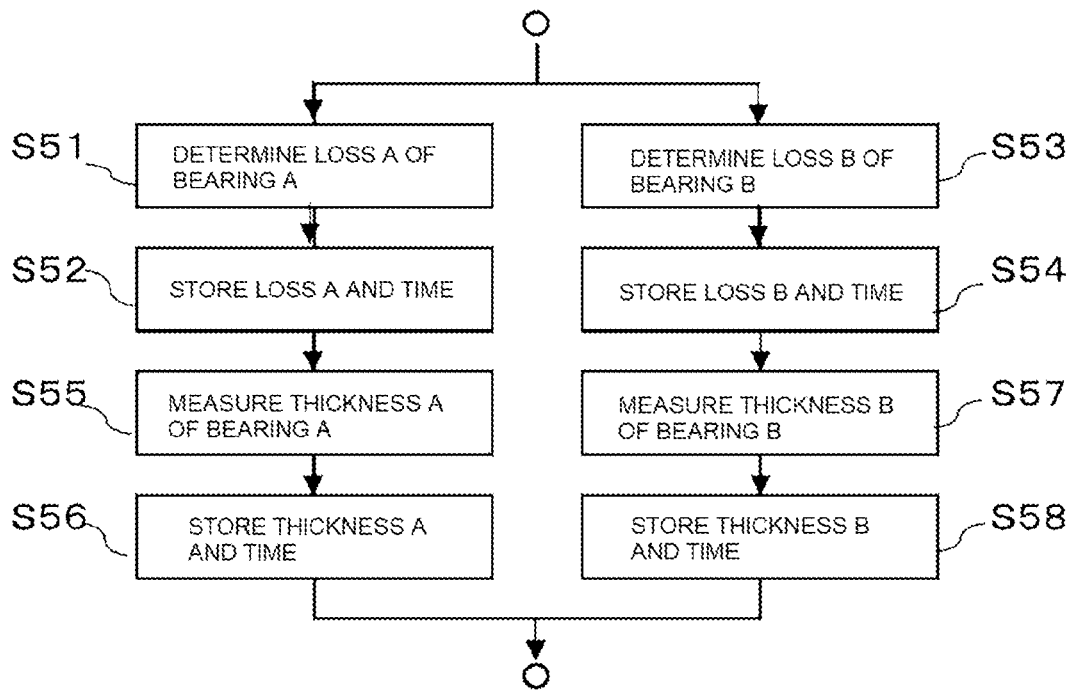
FIG. 6 is a partially developed diagram of the flow chart shown in FIG. 5.

More specifically, as shown in FIG. 6, the loss A of the bearing A11 is determined at predetermined intervals (e.g., 12 hours) after the start of Pattern #1 (Step S51). In the present embodiment, the loss A is determined by allowing the loss computation unit 1101 to convert the value of the temperature of the bearing A11 (the temperature of back surface of the bearing A11) measured by the measurement unit A101 to the value of the loss, and the determined loss A is stored in the first area 1081 of the index storage unit A108 together with the time when the temperature was measured (Step S52). Similarly, the loss B of the bearing B21 is determined (Step S53). The loss B is determined by allowing a loss computation unit 2101 to convert the value of the temperature of the bearing B21 (the temperature of back surface of the bearing B21) measured by the measurement unit B201 to the value of the loss, and the determined loss B is stored in the first area 2081 of the index storage unit B208 together with the time when the temperature was measured (Step S54).

In Step S55, the thickness of the pads of the bearing A11 is measured by the measurement unit A101. The result of the measurement is stored in the second area 1082 of the index storage unit A108 together with measurement time (Step S56). Similarly, the thickness of the pads of the bearing B21 is measured by the measurement unit B201 (Step S57), and the result of the measurement is stored in a second area 2082 of the index storage unit B208 together with measurement time (Step S58).

As for the abrasion of the bearings, as has been described above, the degree of progression of abrasion of the pads of each of the bearings can be determined from the data of the thickness of the pads at the start of the test operation and the thickness of the pads at the end of the test operation. Of course, the thickness of the pads may be measured at predetermined intervals during the test operation and stored in each of the index storage units together with the time when the thickness was measured. This makes it possible to more accurately obtain the index that indicates the usage state of each of the bearings (in this case, the change of thickness of the pads).

Referring to the flow chart in FIG. 5 again, Step S3 and Step S5 are repeatedly performed for each of the patterns shown in Table 1 and Table 2 after the test operation of the bearings is performed under rated conditions (Step S7, Step S9). It is to be noted that the temperature of lubricant oil supplied to the sliding part of each of the bearings as the operation condition is set by changing the angle of the fan 15. It is to be noted that it goes without saying that the temperature of the lubricant oil can be changed by the change of an environment for the bearing even when the angle of the fan 15 is fixed to a constant value, and therefore the angle of the fan 15 can automatically or manually be controlled so that the temperature of the lubricant oil measured by a temperature sensor (not shown) attached to, for example, the outlet of the radiator 17 is always adjusted to a value set as the operation condition.

Further, when the loss of the bearing A and/or the loss of the bearing B are/is equal to or more than the threshold value in the test operation according to each of the patterns, the test operation is preferably forcibly stopped. The control unit 300 or the controller 110 and the controller 210 preferably controls/control the operation condition execution unit A103 and the operation condition execution unit B203 so that the operation according to this pattern is not performed.

In Step S11, the data stored in the memory device 106 and the memory device 206 is sent to the memory device 320 of the control unit 300 through the communication link. In this case, obtained data is sent after all the patterns are performed, but data communication may, of course, be performed every time data is obtained by performing each of the patterns.

Figure 7:
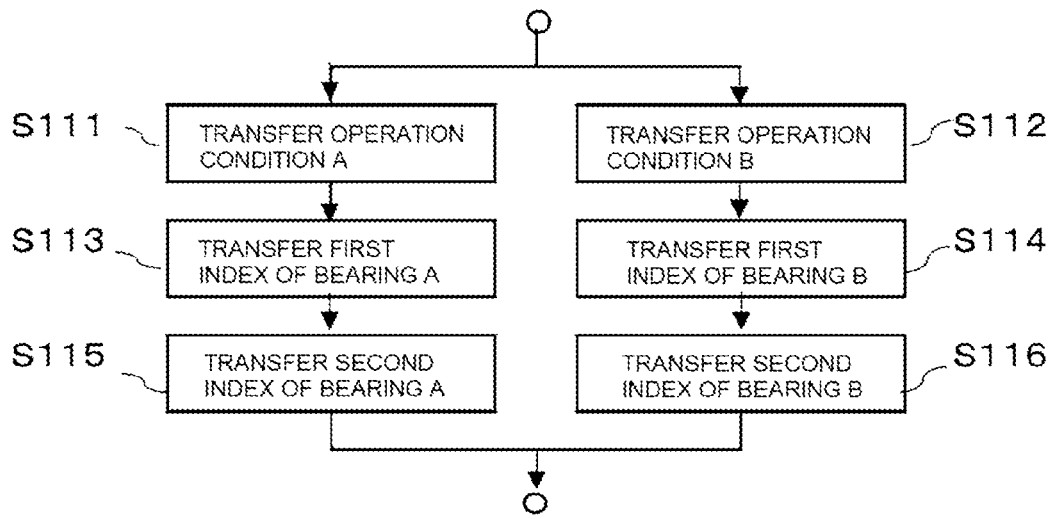
FIG. 7 is a partially developed diagram of the flow chart shown in FIG. 5.

More specifically, as shown in FIG. 7, the first operation condition A of each of the patterns stored in the first area 1071 of the execution operation condition storage unit A107 (i.e., the temperature A of lubricant oil supplied to the sliding part of the bearing A11 and the time when the temperature A was measured) is sent to the first instruction storage unit 321 and the second instruction storage unit 325 (Step S111). Similarly, the first operation condition B of each of the patterns stored in the first area 2071 of the execution operation condition storage unit B207 (i.e., the temperature B of lubricant oil supplied to the sliding part of the bearing B21 and the time when the temperature B was measured) is sent to the first instruction storage unit 321 and the second instruction storage unit 325 (Step S112). Then, the first index A of each of the patterns stored in the first area 1081 of the index storage unit A108 (i.e., the loss A of the bearing A11 and the time when the loss A was measured) is sent to the first instruction storage unit 321 (Step S113), and the first index B of each of the patterns stored in the first area 2081 of the index storage unit B208 (i.e., the loss B of the bearing B21 and the time when the loss B was measured) is sent to the first instruction storage unit 321 (Step S114).

Then, the second index A stored in the second area 1082 of the index storage unit A108 (i.e., the thickness A of the bearing A11 and the time when the thickness A was measured) is sent to the second instruction storage unit 325 (Step S115), and the second index B stored in the second area 2082 of the index storage unit B208 (i.e., the thickness B of the bearing B21 and the time when the thickness B was measured) is sent to the second instruction storage unit 325 (Step S116).

It is to be noted that the present embodiment is described with reference to a case where the bearing system is controlled using the temperature of lubricant oil as the first operation condition. As a second operation condition, a condition different from the first operation condition, for example, the flow rate of lubricant oil supplied to the sliding part of the bearing or the total sliding area of the bearing may be used. Similar to the first operation condition, the second operation condition is stored in the execution operation condition storage unit. More specifically, a second operation condition A related to the bearing A11 is stored in a second area 1072 of the execution operation condition storage unit A107. Similarly, a second operation condition B related to the bearing B21 is stored in a second area 2072 of the execution operation condition storage unit B207.

Referring to the flow chart in FIG. 5 again, in Step S13, the first specification unit 311 determines a relationship (first relationship) from the data set stored in the first instruction storage unit 321 and including the operation condition A and the operation condition B of each of the patterns and the loss of the bearing A11 and the loss of the bearing B21 under the operation condition A and the operation condition B.

More specifically, the first specification unit 311 determines the relationship between the calculation result of the loss (average) of each of the bearing A11 and the bearing B21 and the temperature of lubricant oil, from the data set stored in the first instruction storage unit 321 and including the temperature of lubricant oil for each of the bearings, the time when the temperature of the lubricant oil was measured, the loss of each of the bearings, and the time when the loss was measured.

In Step S15, the thus obtained first relationship is summarized in the form of a table (see Table 1) and stored in the first relationship storage unit 323.

In Step S17, the second specification unit 315 determines a relationship (second relationship) from the data set stored in the second instruction storage unit 325 and including the operation condition A and the operation condition B of each of the patterns and the degree of progression of abrasion of the bearing A11 and the degree of progression of abrasion of the bearing B21 under the operation condition A and the operation condition B.

More specifically, the second specification unit 315 determines the relationship between the calculation result of the amount (degree of progression) of abrasion of pads of each of the bearing A11 and the bearing B21 and the temperature of lubricant oil, from the data set stored in the second instruction storage unit 325 and including the temperature of lubricant oil for each of the bearings, the time when the temperature of the lubricant oil was measured, the thickness of pads of each of the bearings, and the time when the thickness was measured.

In Step S19, the thus obtained second relationship was summarized in the form of a table (see Table 2) and stored in the second relationship storage unit 327.

The first relationship stored in the first relationship storage unit 323 and the second relationship stored in the second relationship storage unit 327 can be output through the input/output unit 304.

When the operator or AI selects a normal mode (Step S21), the first control section 313 of the control unit 300 selects the pattern of the operation conditions under which the smallest loss is achieved from the first relationship stored in the first relationship storage unit 323, and sends these operation conditions to the operation condition execution unit A103 and the operation condition execution unit B203 of the onsite control device 50 (Step S23). Each of the operation condition execution unit A103 and the operation condition execution unit B203 that functions as an operation condition execution unit execute the operation condition sent from the first control section 313, that is, adjusts the fan angle to adjust the temperature of lubricant oil to the predetermined value of each of the patterns (Step S25).

When the operator or AI selects a maintenance mode (Step S21), the second control section 317 of the control unit 300 selects, for example, the pattern of the operation conditions under which the progression of abrasion of the bearing selected by the operator or AI is delayed from the second relationship stored in the second relationship storage unit 327, and sends these operation conditions to the operation condition execution unit A103 and the operation condition execution unit B203 of the onsite control device 50 (Step S24). Each of the operation condition execution unit A103 and the operation condition execution unit B203 that functions as an operation condition execution unit execute the operation condition sent from the second control section 317. That is, the fan angle is adjusted to adjust the temperature of lubricant oil to the predetermined value of each of the patterns (Step S25).

According to the operation mode, each of the control devices of the control unit 300 can automatically select the pattern and give an instruction to the onsite control device 50 to execute the operation conditions of the pattern. The controller 310 can also select the operation condition under which each of the bearing A11 and the bearing B21 achieves its performance required of the bearing system 1, from the first relationship stored in the first relationship storage unit 323 and the second relationship stored in the second relationship storage unit 327, and send these operation conditions to the operation condition execution unit A103 and the operation condition execution unit B203 of the onsite control device 50 through the communication unit 309. The operation conditions at that time can also be stored in the memory device 320.

The selection of the pattern may also be manually performed by the operator through the input/output unit 304. In this case, the operation conditions of the selected pattern are sent by the control unit 300 to the operation condition execution units 103 and 203 of the onsite control device 50 and executed.

The operator who has selected the pattern may directly input the operation conditions of this pattern to the operation condition execution unit A103 and the operation condition execution unit B203 through the input/output unit 104 and the input/output unit 204 of the onsite control device 50.

Also when the normal mode or the maintenance mode is performed, the operation conditions (e.g., the temperature of lubricant oil supplied to the bearing) and the indexes (e.g., the loss of the bearing and the degree of progression of abrasion of the bearing) can be measured and stored to further determine a first relationship and a second relationship.

These first relationship and second relationship are compared with the first relationship and the second relationship stored in the first relationship storage unit 323 and the second relationship storage unit 327. The first relationship and the second relationship can be updated to a new first relationship and a new second relationship, and optimum relationships can be selected from the data stored in the memory device 320 or new optimum relationships can be provided by AI. That is, the data related to the measured indexes of each of the bearings and the executed operation conditions is sent from each onsite control device as a client to the control unit as a server, the control unit determines a relationship such that each of the bearings achieves its performance to optimize the bearing system as a whole, and the data related to the determined relationship is sent from the control unit to each onsite control device so that the operation condition execution units of each onsite control device execute each of the operation conditions of each of the bearings.

When there is a difference equal to or more than a predetermined threshold value between the stored first relationship or second relationship and the newly determined first relationship or second relationship, an alarm is preferably output.

Figure 5:
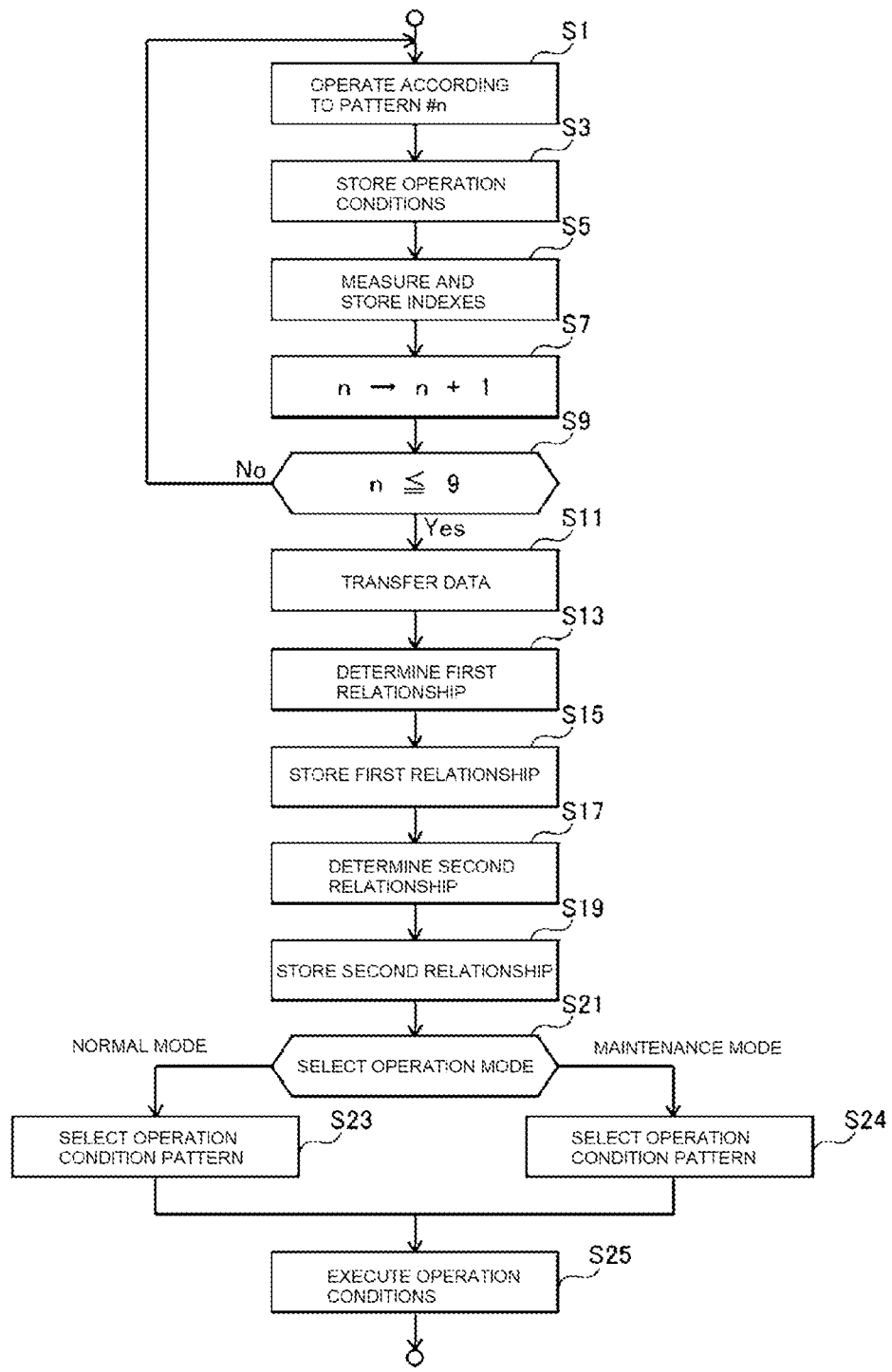
FIG. 5 is a flow chart showing the operation of the bearing system according to the embodiment.

It is to be noted that after maintenance is performed to replace the pads of the bearings, Steps S1 to S9 shown in FIG. 5 are preferably repeatedly performed again.

In this case, when the results (first relationship and second relationship) of a test operation performed by randomly or systematically selecting the pattern are the same as those before the maintenance, it is preferred that the results of the other patterns are also estimated to be the same, and the normal mode (e.g., the operation conditions of the pattern in which the smallest loss is achieved) is performed without performing a test operation for all the patterns.

The bearing system has been described above with reference to a case where two bearings are provided in one bearing assembly, but three or more bearings may be provided in one bearing assembly. However, when the number of bearings increases, the number of patterns of a test operation increases so that the burden of performing a test operation for all the patterns tends to increase.

In this case, the results of patterns extracted randomly or systematically are compared with the data of a plurality of patterns performed in other hydroelectric power stations. For example, the data of patterns nearest to that of a hydroelectric power station of interest is extracted from the data of patterns stored in the past by general-purpose nearest neighbor search and used as reference for a test operation.

As shown in FIG. 1, the bearing system may include a plurality of bearing assemblies and a plurality of onsite control devices. In this case, an example of such a bearing system is one in which a plurality of plants having a plurality of bearings are connected through communication link.

On the other hand, the bearing assembly may be of a type in which a plurality of bearings (sliding parts) support a common shaft. In this case, an example of such a bearing assembly is one in which two bearings (sliding parts) are provided for one shaft.

As described above, it is clear that a test operation can easily be planned by accumulating the data of many hydroelectric power stations. Therefore, for the purpose of accumulating the data (an operation condition and a change of index caused by changing the operation condition) of bearings operated in each of hydroelectric power stations, it is preferred that the onsite control devices are provided as clients in each of the hydroelectric power stations and are connected to the control unit as a server through communication link to accumulate data in the control unit as a server. The same is true when many plants are targeted.

When the onsite control devices as clients are connected to the control unit as a server in this way, the control unit can send instructions to all the plurality of onsite control devices or can selectively send to some of the onsite control devices in the event of an emergency such as earthquake to operate bearings controlled by the onsite control devices, that is, electrical power generators or pumps in an emergency operation mode.

The present invention is not limited to the description of the above aspects, embodiment, and examples. The present invention also includes various modified embodiments readily conceivable by those skilled in the art without departing from the scope of the claims.

REFERENCE SIGNS LIST

1 Bearing system
10 Bearing assembly
11 Bearing A
21 Bearing B
100 Measurement execution unit A
101 Measurement unit A
103 Operation condition execution unit A
200 Measurement execution unit B
201 Measurement unit B
203 Operation condition execution unit B
300 Control unit
313 First control section
317 Second control section
321 First instruction storage unit
325 Second instruction storage unit

The invention claimed is:

1. A bearing system comprising:
a bearing A and a measurement execution unit A therefor;
a bearing B and a measurement execution unit B therefor; and
a control unit that controls the measurement execution unit A and the measurement execution unit B, wherein
the measurement execution unit A includes:
a measurement unit A that measures an index that indicates a usage state of the bearing A, and
an operation condition execution unit A that executes an operation condition A that is imposed on the bearing A and influences the usage state of the bearing A,
the measurement execution unit B includes:
a measurement unit B that measures an index that indicates a usage state of the bearing B, and
an operation condition execution unit B that executes an operation condition B that is imposed on the bearing B and influences the usage state of the bearing B,
the control unit includes:
an instruction storage unit that stores a plurality of sets of the operation condition A and the operation condition B and an index A and an index B obtained from the bearing A and the bearing B respectively when the operation condition A and the operation condition B are executed, and
a control section that controls the operation condition execution unit A and the operation condition execution unit B on a basis of contents stored in the instruction storage unit to control the index of the bearing A and the index of the bearing B so that their respective given targets are achieved, and
the measurement execution unit A, the measurement execution unit B, and the control unit are connected through a communication link, and measured indexes and executed operation conditions are sent from the measurement execution unit A and the measurement execution unit B to the control unit through the communication link.

2. The bearing system according to claim 1, wherein
the operation condition A is an abrasion condition A and/or a temperature condition A for the bearing A, and
the operation condition B is an abrasion condition B and/or a temperature condition B for the bearing B.

3. The bearing system according to claim 2, wherein
the abrasion condition A is a temperature of lubricant oil for the bearing A, and
the abrasion condition B is a temperature of lubricant oil for the bearing B.

4. The bearing system according to claim 3, wherein
the temperature of the lubricant oil for the bearing A is controlled by a fan angle of a fan that sends air to the bearing A, and
the temperature of the lubricant oil for the bearing B is controlled by a fan angle of a fan that sends air to the bearing B.

5. The bearing system according to claim 2, wherein
the temperature condition A is a flow rate of lubricant oil, and
the temperature condition B is a flow rate of lubricant oil.

6. The bearing system according to claim 2, wherein
the abrasion condition A is an area of the bearing A, and
the abrasion condition B is an area of the bearing B.

7. The bearing system according to claim 1, wherein the index is a loss of the bearing A and the bearing B and/or a degree of progression of abrasion of the bearing A and the bearing B.

8. The bearing system according to claim 7, wherein the loss used as the index is calculated from a temperature of a back surface of the bearing A and the bearing B.

9. A control method for a bearing A and a bearing B in a bearing system comprising: the bearing A and a measurement execution unit A therefor, the bearing B and a measurement execution unit B therefor, and a control unit that controls the measurement execution unit A and the measurement execution unit B, wherein
the measurement execution unit A includes:
a measurement unit A that measures an index that indicates a usage state of the bearing A, and
an operation condition execution unit A that executes an operation condition A that is imposed on the bearing A and influences the usage state of the bearing A, and the measurement execution unit B includes:
a measurement unit B that measures an index that indicates a usage state of the bearing B, and
an operation condition execution unit B that executes an operation condition B that is imposed on the bearing B and influences the usage state of the bearing B,
wherein the control method comprises the steps of:
storing, in an instruction storage unit, a plurality of sets of the operation condition A and the operation condition B and an index A and an index B obtained from the bearing A and the bearing B respectively when the operation condition A and the operation condition B are executed; and
controlling the operation condition execution unit A and the operation condition execution unit B on a basis of contents stored in the instruction storage unit to control the index of the bearing A and the index of the bearing B so that their respective given targets are achieved.

10. The control method according to claim 9, wherein
the operation condition A is an abrasion condition A and/or a temperature condition A for the bearing A, and the operation condition B is an abrasion condition B and/or a temperature condition B for the bearing B.

11. The control method according to claim 10, wherein
the abrasion condition A is a temperature condition of lubricant oil for the bearing A, and
the abrasion condition B is a temperature condition of lubricant oil for the bearing B.

12. The control method according to claim 11, wherein
the temperature condition of the lubricant oil for the bearing A is a fan angle of a fan that sends air to the bearing A, and
the temperature condition of the lubricant oil for the bearing B is a fan angle of a fan that sends air to the bearing B.

13. The control method according to claim 10, wherein the temperature condition A is a flow rate of lubricant oil, and the temperature condition B is a flow rate of lubricant oil.

14. The control method according to claim 10, wherein
the abrasion condition A is an area of the bearing A, and
the abrasion condition B is an area of the bearing B.

15. The control method according to claim 9, wherein the index is a loss of the bearing A and the bearing B and/or a degree of progression of abrasion of the bearing A and the bearing B.

16. The control method according to claim 15, wherein the loss used as the index is calculated from a temperature of a back surface of the bearing A and the bearing B.

17. A computer program product, comprising a computer readable hardware storage device storing a computer readable program code, the computer readable program code including an algorithm that, when executed by a processor of a computing system, implements a method for controlling a bearing A and a bearing B in a bearing system comprising: the bearing A and a measurement execution unit A therefor, the bearing B and a measurement execution unit B therefor, and a control unit that controls the measurement execution unit A and the measurement execution unit B, wherein
the measurement execution unit A includes:
a measurement unit A that measures an index that indicates a usage state of the bearing A, and
an operation condition execution unit A that executes an operation condition A that is imposed on the bearing A and influences the usage state of the bearing A, and the measurement execution unit B includes:
a measurement unit B that measures an index that indicates a usage state of the bearing B, and
an operation condition execution unit B that executes an operation condition B that is imposed on the bearing B and influences the usage state of the bearing B,
wherein the computer program allows a computer to execute the steps of:
storing, in an instruction storage unit, a plurality of sets of the operation condition A and the operation condition B and an index A and an index B obtained from the bearing A and the bearing B respectively when the operation condition A and the operation condition B are executed; and
controlling the operation condition execution unit A and the operation condition execution unit B with reference to contents stored in the instruction storage unit to control the index of the bearing A and the index of the bearing B so that their respective given targets are achieved.

* * * * *